United States Patent [19]

Amr et al.

[11] Patent Number: 4,747,275
[45] Date of Patent: May 31, 1988

[54] APPARATUS FOR CONTROLLING FLOW THROUGH A CENTRIFUGAL IMPELLER

[75] Inventors: Yehia M. Amr, Manlius; John F. Salvattera, Camillus, both of N.Y.

[73] Assignee: Carrier Corporation, Syracuse, N.Y.

[21] Appl. No.: 98,489

[22] Filed: Sep. 18, 1987

[51] Int. Cl.$^4$ .............................................. F25D 17/06
[52] U.S. Cl. ........................................ 62/419; 62/426; 62/428; 165/121; 416/189
[58] Field of Search .......................... 62/419, 426, 428; 165/121, 122; 416/189 R

[56] References Cited

U.S. PATENT DOCUMENTS

| | | | |
|---|---|---|---|
| 2,952,994 | 9/1960 | Partington et al. | 62/428 X |
| 3,756,039 | 9/1973 | Riello | 62/428 X |
| 3,874,191 | 4/1975 | Hudson | 62/419 X |
| 4,111,000 | 9/1978 | Sakazume et al. | 62/262 |
| 4,181,172 | 1/1980 | Longhouse | 165/121 X |
| 4,672,819 | 6/1987 | Mino et al. | 62/426 X |

*Primary Examiner*—Lloyd L. King
*Attorney, Agent, or Firm*—Thomas J. Wall

[57] ABSTRACT

An air conditioner unit that includes a housing containing a heat exchanger and a centrifugal impeller positioned behind the heat exchanger for drawing comfort air over the exchanger surfaces and returning the air to a comfort zone. A support wall is placed between the heat exchanger and the inlet of the impeller and an orifice is mounted in the wall for directing conditioned air into the fan inlet. A cylindrical shield is also mounted upon the wall and surrounds the orifice. The shield is axially aligned with the impeller and its end face positioned adjacent to the inlet face of the impeller. The axial length of the orifice from the wall is less than that of the surrounding shield so that a wide circular throat is established around the entrance region of the impeller. The velocity of air drawn through the gap between the shield and the impeller is thus reduced within the throat to minimize its adverse effect on the primary air flow entering the orifice.

12 Claims, 1 Drawing Sheet

U.S. Patent
May 31, 1988
4,747,275
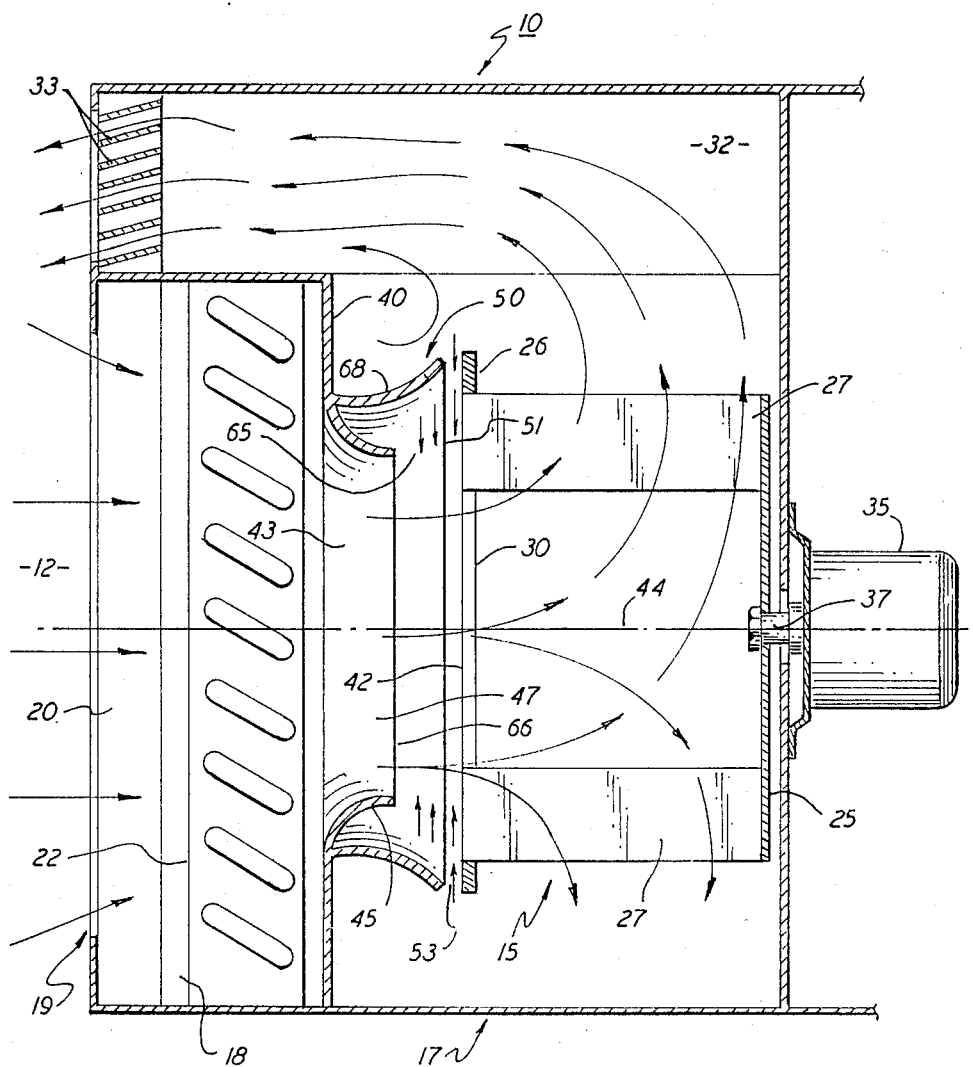

APPARATUS FOR CONTROLLING FLOW THROUGH A CENTRIFUGAL IMPELLER

BACKGROUND OF THE INVENTION

This invention relates to air conditioning and, in particular, to an air conditioning unit having improved air handling characteristics and reduced noise levels.

Improving the operating performance of packaged air conditioners, such as room window units, is an ongoing effort in the air conditioning industry. The control of the return air flow through this type of compact unit poses special problems because of the restricted amount of space that is available within the unit. Typically centrifugal blowers are used to draw comfort air into the unit and through a heat exchanger for either heating or cooling the air in the flow stream. After passing through the heat exchanger, the conditioned air is drawn into the blower where it is turned 90 degrees before being discharged into a return duct. Typically the impeller used is a drum shaped assembly having a front shroud ring and a closed back wall that are connected by a series of axially disposed curved blades spaced about the drum periphery. The incoming air must turn from an axial direction to a radial direction to enter the impeller blades.

A bell mouth orifice is used at the inlet to the blower to gather the air drawn over the heat exchanger surfaces and conduct it into the impeller inlet. A narrow clearance gap is maintained between the moving impeller and the discharge end of the orifice. Unwanted air is drawn radially through the gap and across the front of the impeller, interfering with the inlet airflow. The velocity of the radially moving flow is relatively high and, as a consequence, a disturbance is created within the inlet region of the impeller. It has also been found that this disturbance in the incoming flow pattern increases the axial width of the stagnated air within the impeller itself which considerably reduces the amount of air that can be effectively passed through the impeller. In some cases the blower capacity may be reduced as much as fifty percent. As a consequence, the impeller is required to work harder in order to deliver the necessary system flow and the noise produced by the impeller is relatively high.

SUMMARY OF THE INVENTION

It is therefore an object of the present invention to improve air conditioning units and, in particular, small packed units.

It is a further object of the present invention to reduce the power demands of a centrifugal type impeller used to circulate comfort air through a packaged air conditioner unit.

A still further object of the present invention is to reduce the noise level of a centrifugal type impeller used in an air conditioning unit.

Yet another object of the present invention is to improve the air handling properties of a centrifugal impeller used in an air conditioning unit.

These and other objects of the present invention are attained by means of an air conditioning unit having a housing that contains a heat exchanger for heating or cooling incoming comfort zone air and a centrifugal impeller mounted behind the heat exchanger that is arranged to draw air over the heat exchanger surfaces and return the air to the comfort zone. A partition wall is positioned between the heat exchanger and the impeller inlet and a hollow bellmouth orifice is mounted in the wall for conducting air from the heat exchanger into the impeller inlet. A circular shield is also mounted on the wall which surrounds the orifice. The end face of the shield is positioned adjacent to the shroud ring of the impeller to provide a narrow clearance gap therebetween. Under the influence of the impeller, surrounding air is pulled radially through the gap towards the impeller inlet. Because of the narrow width of the gap this radial flow of air typically is moving at a relatively high velocity. The axial length of the orifice from the support wall is considerably less than that of the shield and a relatively wide circular throat is established between the discharge end of the orifice around the impeller inlet region. The area through which the radially moving air passes is thus rapidly expanded at the entrance throat and the velocity of the flow stream is correspondingly reduced. As a result, the disturbance created by the air drawn through the gap has little effect on the main stream of comfort zone air flowing axially into the impeller thus raising the efficiency of the impeller and reducing its noise level.

BRIEF DESCRIPTION OF THE DRAWING

For a better understanding of these and other objects of the present invention reference is made to the following detailed description of the invention which is to be read in conjunction with the accompanying drawing which is a partial side elevation in section showing a packaged air conditioning unit embodying the teachings of the present invention.

DESCRIPTION OF THE INVENTION

Turning now to the drawing, there is shown a window type air conditioning unit 10 that is arranged to deliver conditioned air to an indoor comfort region indicated generally at 12. Although the present invention will be described with particular reference to a window unit, it should be clear to one skilled in the art that the invention has application in any type of packaged unit employing a centrifugal blower of the type shown at 15 for pumping conditioned air through the system.

The air conditioning unit includes a box like housing 17 having a front opening 18 in which a cover panel 19 is removably mounted. The cover panel has an air entrance opening 20 in the lower section thereof behind which is mounted a heat exchanger 22 of conventional design. Depending upon the mode of operation, the heat exchanger will provide either heating or cooling to comfort air as it is being drawn over its heat transfer surfaces.

Centrifugal impeller 15 is mounted within the housing behind heat exchanger 22. The impeller is generally cylindrical or drum shaped and includes a closed back wall 25 and an axially aligned front shroud ring 26 that are connected by circumferentially spaced blades 27-27 to form an impeller. The impeller blades are curved in a forward direction in relation to the direction of impeller rotation. The impeller draws comfort air through the heat exchanger and into its eye or inlet 30. The axially moving air stream entering the impeller is then turned 90 degrees and discharged radially, as indicated by the arrows, into a return duct 32 situated in the top section of the housing. The return air is conducted along the duct and is exhausted from the housing through return louvers 33 provided in the front panel of the unit.

The impeller is driven by a motor 35 mounted behind the impeller. The impeller is connected to the motor by means of a drive shaft 37 that is secured to back wall 25 of the impeller by any suitable means. Although not shown, the motor may also be adapted to drive a second impeller for moving ambient air over a second heat exchanger mounted in the back of the housing. As is well known in the art, the two heat exchanger units are connected into a refrigerant loop along with a compressor and an expansion valve to complete the air conditioning circuit.

A vertical wall 40 is positioned between the back of heat exchanger 22 and the inlet face 42 of the impeller. A hollow bellmouth orifice 45 having a circular cross section is molded as part of the wall 40 and contains a tapered flow channel 43 that is axially aligned with the axis 44 of the impeller. The flow channel of the orifice has a reduced discharge opening 47 that is arranged to direct incoming air into the impeller inlet. The diameter of the orifice discharge opening is between the inlet and discharge diameter of the impeller.

A contoured circular shield 50 is supported upon the wall 40 and surrounds the inlet orifice 45. In assembly, the end face 51 of the shield is positioned adjacent to the shroud ring of the impeller. Clearance is provided between two members to permit the impeller to turn freely about its axis and provide sufficient room for the parts to be assembled within the housing. Accordingly, a narrow gap 53 is established between the impeller and the shield through which recirculated air is drawn into the impeller. Because the gap is narrow, the velocity of the recirculated air is typically high. Normally, when left uncorrected, this high velocity air stream will move radially into the incoming comfort air flow within the entrance region of the impeller. It has also been discovered that this type of disturbance within the inlet region of the impeller also produces flow problems inside the impeller. Circulating currents of stagnated air are set up at the front of the impeller which blocks the noram flow of air through the blades. Here again, because of this air blockage, the impeller is forced to work even harder to keep up with the requirements of the system. This causes a disturbance in the incoming flow stream which, as noted above, forces the impeller to work harder in order to meet the airflow rate requirements of the system.

The harmful effect of this high velocity flow of air moving through gap 53 on the aerodynamic characteristics of the impeller are considerably reduced or eliminated in the present invention by reducing the velocity of the radially moving flow before it can enter the inlet region of the impeller. This is achieved by providing a relatively wide, axially, circular throat 65 between the end face 66 of the orifice and the shroud ring 26 of the impeller. The area of the throat is considerably greater than that of the gap 53 so that area of the recirculating flow stream is expanded rapidly before it can enter the inlet region of the impeller. The shield and inlet orifice combine to act much like a diffuser nozzle to reduce the velocity of the incoming radial flow stream to a level that will not adversely effect the aerodynamic flow characteristics at the inlet to the impeller and conditioned air drawn from heat exchanger 22 is permitted to flow freely through the impeller.

In practice, the diameter of the shield at its end face is about equal to the outside diemater of the impeller shroud ring 26. A gap having a width that is about equal to 2 or 3% of the outside diameter of the impeller is maintained between the impeller and the shield. The discharge opening of the inlet orifice is about an average of the impeller inlet and discharge diameters, and the axial length of the orifice from the wall 40 is about one half the axial length of the shield. The length of the orifice, however, may be varied to control the area of the throat and thus maintain the velocity of the radially moving flow stream within desired limits. The shield 50 may be a straight walled cylinder, however, it is preferred that the side wall 68 of the shield be acurate in form to direct air in this region outwardly away from the gap 53. As shown by the arrows in the drawing, this shape also promotes efficient movement of air through the return air duct.

While this invention has been explained with reference to the structure disclosed herein, it is not confined to the details set forth and this application is intended to cover any modifications and changes as may come within the scope of the following claims.

What is claimed is:

1. In an air conditioning unit having a housing containing a heat exchanger and a centrifugal impeller blower has an inlet opening facing the back of the heat exchanger so that the impeller draws comfort zone air over the heat exchanger surfaces and return the air to the comfort zone, said unit further including, a hollow orifice mounted behind the heat exchanger having a passage for conducting comfort zone air to the inlet region of the impeller, the discharge end of the orifice being spaced from the inlet face of the impeller to provide a circular throat around the impeller, and a circular shield surrounding the orifice and having an end face that is positioned adjacent the inlet face of the impeller to provide a narrow gap therebetween, the width of the gap being less than the width of the throat, whereby the air flow drawn radially through said gap is expanded rapdily in the throat to reduce its velocity prior to entering the inlet region of the impeller.

2. The unit of claim 1 wherein the diameter of the discharge opening in the orifice is about half the sum of the inlet and discharge impeller diameters, and is axially aligned therewith.

3. The unit of claim 2 wherein the end face of the circular shield has a diameter that is about equal to the outside diameter of the impeller.

4. The unit of claim 3 wherein the gap width is equal to about between 2 and 3% of the outside diameter of the impeller.

5. The unit of claim 1 wherein the orifice passage coverges from the heat exchanger toward the impeller inlet.

6. The unit of claim 1 wherein the side wall of the shield is arcuate shaped to direct air flowing thereover away from said gap.

7. The unit of claim 1 wherein the orifice and the shield are mounted upon a common support in axial alignment with the impeller.

8. Air handling apparatus for use in an air conditioning unit that includes a housing containing a heat exchanger for conditioning comfort air and a rotatably mounted centrifugal impeller having axial inlet mounted behind the heat exchanger for drawing comfort air over the heat exchanger surfaces and recirculating the air back to a comfort zone through a return duct, a support wall separating the heat exchanger and the impeller having a hollow orifice mounted in the wall for conducting air from the heat exchanger to the inlet region of the impeller, a circular shield mounted upon said wall that surrounds the orifice and which forms a narrow gap with the inlet face of the impeller, and said orifice having an axial length that is less than the axial length of the shield to provide an expanded throat around the inlet region of the impeller whereby the velocity of air drawn through the gap is reduced prior to the air entering the inlet region of the impeller.

9. The apparatus of claim 8 wherein the axial length of the orifice is about one half that of the shield.

10. The apparatus of claim 9 wherein the orifice has a round discharge opening that is about half the sum of the impeller inlet and discharge diameters.

11. The apparatus of claim 10 wherein the end face of the shield adjacent the impeller has a diameter about equal to the outside diameter of the impeller.

12. The apparatus of claim 8 wherein the side wall of the shield is arcuate shaped to direct air moving thereover away from said gap.

* * * * *